(12) United States Patent
Shimizu et al.

(10) Patent No.: US 8,975,336 B2
(45) Date of Patent: Mar. 10, 2015

(54) METHOD OF MELT KNEADING, EXTRUDATE, AND TRANSPARENT RESIN MATERIAL

(75) Inventors: Hiroshi Shimizu, Ibaraki (JP); Yongjin Li, Hangzhou (CN)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 796 days.

(21) Appl. No.: 13/131,330

(22) PCT Filed: Nov. 26, 2009

(86) PCT No.: PCT/JP2009/069919
§ 371 (c)(1),
(2), (4) Date: Aug. 2, 2011

(87) PCT Pub. No.: WO2010/061872
PCT Pub. Date: Jun. 3, 2010

(65) Prior Publication Data
US 2011/0282006 A1  Nov. 17, 2011

(30) Foreign Application Priority Data

Nov. 26, 2008  (JP) .................. 2008-300624
May 25, 2009  (JP) .................. 2009-125048

(51) Int. Cl.
*C08L 69/00* (2006.01)
*C08L 33/10* (2006.01)
(Continued)

(52) U.S. Cl.
CPC . *B29B 7/125* (2013.01); *B29B 7/28* (2013.01); *B29C 47/822* (2013.01);
(Continued)

(58) Field of Classification Search
USPC ............. 525/54, 185, 931, 461; 366/79, 90; 977/900; 528/502 F
See application file for complete search history.

(56) References Cited

U.S. PATENT DOCUMENTS

2008/0045657 A1  2/2008  Shimizu et al.
2008/0318318 A1  12/2008  Shimizu et al.

FOREIGN PATENT DOCUMENTS

EP  2 177 570 A1  4/2010
JP  6-339920  12/1994
(Continued)

OTHER PUBLICATIONS

Shimizu, et al, "Formation of Nanostructured PVDF/PA11 Blends Using High-Shear Processing," Macromolecules 2005, 38, 7880-7883.*
(Continued)

*Primary Examiner* — Fred M Teskin
(74) *Attorney, Agent, or Firm* — Kratz, Quintos & Hanson, LLP (57) ABSTRACT

It is an object of the present invention to obtain an optically transparent nano-dispersed polymer blend extrudate and a transparent resin having a microscopic dispersion structure in which incompatible polymer blend is melted and kneaded, one of resins is formed into a matrix, a size of dispersed phase of the other resin is controlled to 300 nm or less, more preferably 100 nm or less. Extra additive such as a compatibilizer is not added. When the incompatible polymer blend is melted and kneaded using a high shearing and forming apparatus having an inner feedback type screw under a condition that the screw rotation speed is 600 rpm to 3000 rpm, the rotation speed of the inner feedback type screw is increased, the kneading time is set under constant rotation speed, the high shearing forming condition is adjusted, and a structure in which a size of dispersed phase is controlled to 300 nm or less, more preferably 100 nm or less is formed.

10 Claims, 7 Drawing Sheets

(51) Int. Cl.
*C08J 5/18* (2006.01)
*B29B 7/12* (2006.01)
*B29B 7/28* (2006.01)
*B29C 47/82* (2006.01)
*B29C 47/86* (2006.01)
*B29C 47/92* (2006.01)
*C08J 3/00* (2006.01)
*B29C 47/38* (2006.01)
*B29C 47/60* (2006.01)
*B29B 7/42* (2006.01)
*B29C 47/00* (2006.01)
*B29C 47/14* (2006.01)
*B29C 47/72* (2006.01)
*B29L 7/00* (2006.01)
*B29L 31/06* (2006.01)
*B29L 31/00* (2006.01)

(52) U.S. Cl.
CPC ............ *B29C 47/862* (2013.01); *B29C 47/92* (2013.01); *C08J 3/005* (2013.01); *C08L 33/10* (2013.01); *C08L 69/00* (2013.01); *B29C 47/385* (2013.01); *B29C 47/6018* (2013.01); *B29C 47/6093* (2013.01); *B29C 47/0014* (2013.01); *B29C 47/0016* (2013.01); *B29C 47/0021* (2013.01); *B29C 47/14* (2013.01); *B29C 47/60* (2013.01); *B29C 47/725* (2013.01); *B29C 47/82* (2013.01); *B29C 47/86* (2013.01); *B29C 2947/9259* (2013.01); *B29C 2947/92742* (2013.01); *B29C 2947/92809* (2013.01); *B29C 2947/92942* (2013.01); *B29L 2007/008* (2013.01); *B29L 2031/06* (2013.01); *B29L 2031/731* (2013.01); *C08J 2333/10* (2013.01); *C08J 2369/00* (2013.01); *C08L 2205/14* (2013.01); *Y10S 525/931* (2013.01); *Y10S 977/90* (2013.01)
USPC ............ 525/185; 525/54; 525/461; 525/931; 528/502 F; 366/79; 366/90; 977/900

(56) References Cited

FOREIGN PATENT DOCUMENTS

| | | | |
|---|---|---|---|
| JP | 2001-187405 | A1 | 7/2001 |
| JP | 2003-127133 | A1 | 5/2003 |
| JP | 2005-139347 | | 6/2005 |
| JP | 2005-178146 | A1 | 7/2005 |
| JP | 2005-313608 | A1 | 11/2005 |
| JP | 2006-142715 | A1 | 6/2006 |
| JP | 2006-241195 | | 9/2006 |
| JP | 2009-29114 | A1 | 2/2009 |
| JP | 2009-196196 | * | 9/2009 |

OTHER PUBLICATIONS

Machine translation of JP 2009-196196; publication date: Sep. 2009.*

International Search Report for International Application No. PCT/JP2009/069919 dated Dec. 14, 2009.

Extended European Search Report dated Jul. 18, 2013, in counterpart European Application No. 09829117.2.

* cited by examiner

METHOD OF MELT KNEADING, EXTRUDATE, AND TRANSPARENT RESIN MATERIAL

TECHNICAL FIELD

The present invention relates to a melting and kneading method in which an immiscible polymer blend is melted and kneaded using a high shearing and forming apparatus having an inner feedback type screw, thereby forming one of polymer components into a matrix, the other polymer component is dispersed to this matrix while controlling a dispersion size to several tens of nanometer level, thereby producing an extrudate (which is a kneaded material kneaded and extruded by the high shearing and forming apparatus, and which includes a film and a sheet) of a nanodisperse polymer blend having a microscopic dispersion structure, and the invention also relates to the nanodisperse polymer blend extrudate produced by this melting and kneading method.

More specifically, the present invention relates to an extrudate of a polymer blend which has excellent transparency of 80% or higher transmissivity in a wavelength region (400 nm to 700 nm) of a visible part, which is utilized in an optical field, and which has excellent mechanical characteristics and also relates to the melting and kneading method of the extrudate.

BACKGROUND TECHNIQUE

Conventionally, it is reported that when an immiscible polymer blend system is simply mechanically mixed using a normal kneading extruder (rotation speed of a screw is about 300 rpm), a theoretical and experimental limit of dispersed phase size of one of polymer components is 350 nanometers (nm) (see non-patent document 1).

Therefore, to muster performance or function of a desired polymer blend as a synergistic effect, a kneading operation is carried out using a compatibilizer having compatibility or adherence property with respect to one or both of blend components.

However, since they do not substantially dissolve in each other at the molecular level, if one of the polymer components is formed into a matrix, only a polymer blend extrudate in which a dispersed phase size of the other polymer component is several microns to submicronmeters level is obtained, and it is not possible to enhance the performance or function thereof to the limit.

A reactive processing technique which was developed 30 years ago is a method for lowering an interfacial tension to reduce a dispersed phase size by making functional groups existing between blend components react with each other (see non-patent document 1). A dispersed phase size of a polymer blend system was successfully reduced to a level of submicron meter to several tens of nanometer, but since reactive groups do not exists between the two components, this method is not realized and this fact becomes an impediment technically.

Therefore, to muster a synergistic effect of performance and function of the immiscible polymer blend system to make a blend, it is necessary to control dispersed phase in a size close to a molecular level, and it is difficult to easily produce a nanodisperse polymer blend according to an extension of the conventional technique.

A reaction product generated by a mix of additive such as a compatibilizer or a reactive processing method becomes "defect or foreign matter" in terms of structure in optical material and electronic or electric material which requires a continuous and pure microstructure, there is a drawback that the residue becomes a serious failure in effect.

Under such a technical background, the present inventors successfully produced a high shearing and forming apparatus having an inner feedback type screw capable of rotating the screw at 1000 rpm or higher (maximum output was 3000 rpm), and a patent application was already filed (see patent document 1).

PRIOR ART DOCUMENT

Patent Document

Patent Document 1: Japanese Patent Application Laid-open No. 2005-313608

Non-Patent Document

Non-Patent Document 1: U. Sundararaj and C. W. Macosko, Macromolecules, 28, 2647, (1995)
Non-Patent Document 2: F. lde and A. Hasegawa, J. Appl. Polym. Sci., 18, 963 (1974)

DISCLOSURE OF THE INVENTION

Problem to be Solved by the Invention

It is an object of the present invention to solve the problem generated in the conventional technique, and to realize a melting and kneading method in which an immiscible polymer blend system is melted and kneaded using an high shearing and forming apparatus having an inner feedback type screw without adding extra additive such as a compatibilizer, one of polymer components is formed into a matrix, the other polymer component is dispersed, a dispersed phase size thereof is controlled to 300 nm or less, more preferably 100 nm or less, and an extrudate of the polymer blend having a microscopic dispersion structure (including a film and a sheet) is produced. It is also an object of the invention to realize the extrudate.

Means for Solving the Problem

To solve the problem, the invention provides a melting and kneading method for producing a compatible nanostructured resin, wherein dispersed phases are uniformly dispersed in a matrix resin, comprising: a supplying step of supplying at least two incompatible resins from a material supplying part into a melting and kneading part which includes a cylinder, a screw, the material supplying part and a heating part; and a melting and kneading step of melting and kneading the incompatible resins, wherein a rotation speed of the screw is set into a range from 600 rpm to 3000 rpm, and a shear rate of the screw is set into a range from 900 to 4500 $\sec^{-1}$.

To solve the problem, the invention provides a melting and kneading method for producing a compatible nanostructured resin, wherein dispersed phases are uniformly dispersed in a matrix resin, comprising: a supplying step of supplying at least two incompatible resins from a material supplying part into a melting and kneading part which includes a cylinder, a screw, the material supplying part and a heating part; and a melting and kneading step of melting and kneading the incompatible resins, under performing circulation in which the melted and kneaded resin is fed from a rear end of the screw to a front end thereof and trapped in a gap formed in the front end of the screw and then, returned from the gap to the rear end of the screw, wherein a rotation speed of the screw is set into a range from 600 rpm to 3000 rpm, and a shear rate of the screw is set into a range from 900 to 4500 sec$^{-1}$.

To solve the problem, the invention provides a melting and kneading method for producing a compatible nanostructured resin, wherein dispersed phases are uniformly dispersed in a matrix resin, comprising: a supplying step of supplying at least two incompatible resins from a material supplying part into a melting and kneading part which includes a cylinder, a screw, the material supplying part, a heating part and a seal; and a melting and kneading step of melting and kneading the incompatible resins, under performing circulation in which the resin is fed from a rear end of the screw to a front end thereof and trapped in a gap formed in the front end of the screw and then, returned from the gap to the rear end of the screw, wherein a gap formed between a tip end surface of the screw and a seal surface opposed to the tip end surface is set into a range from 0 to 5 mm, an inner diameter of a hole of the screw is set into a range from 1 mm to 5 mm, and a rotation speed of the screw is set into a range from 600 rpm to 3000 rpm, a shear rate of the screw is set into a range from 900 to 4500 sec$^{-1}$, and the resin is heated to a temperature higher than a glass transition point when the resin is amorphous resins or the resin is heated to a temperature higher than a melting point of crystalline resins when the resin is crystalline resin.

It is preferable that the incompatible resins has a polycarbonate of 97 to 3 weight % and a methacryl-based resin of 3 to 97 weight %.

It is preferable that the methacryl-based resin comprises one selected from group of a polymethyl methacrylate, polyethyl methacrylate or polybutyl methacrylate.

The melted and kneaded resin may be formed as an extrudate and extruded.

To solve the problem, the invention provides a an extrudate which is made by the above-described melting and kneading method.

The extrudate comprises any one of a rod, a film, a sheet and fiber.

It is preferable that in the extrudate, dispersed phases having sizes of 300 nm or less, more preferably 100 nm or less are uniformly dispersed in a matrix resin.

It is preferable that the extrudate has transmissivity of 80% or higher in 400 nm to 700 nm which is wavelength region of a visible part when the resin is formed into a film having a thickness of 100 μm.

Effect of the Invention

According to the present invention, the incompatible blend systems which are not blended with each other in a stationary cultivation place are melted and kneaded using the high shearing and forming apparatus having the inner feedback type screw without adding extra additive such as a compatibilizer for several tens seconds to several minutes at the screw rotation speed of 600 rpm to 3000 rpm. According to this, it is possible to easily realize a polymer blend extrudate having the above structure, i.e., dispersed phase of 300 nm or less, more preferably 100 nm or less.

That is, according to the present invention, even if the material is the incompatible blend system, if one of the polymer components is formed into a matrix, it is possible to produce a polymer blend extrudate (including a film and a sheet) of a microscopic dispersion structure in which a dispersed phase size of the other polymer component is controlled into a diameter of 300 nm or less, more preferably 100 nm or less, or of a structure (bicontinuous structure) in which both the polymer components are continuously connected to each other microscopically.

In a material having such a structure, a diameter of one of the blend components is 300 nm or less and more preferably 100 nm or less, and it is mixed into the other blend component microscopically. Therefore, as a compared with a conventional phase-separated material in which a dispersed phase size is large (several micrometers or more) see/land structure (so-called "dispersion structure"), since original properties of polymer constituting the blend are synergistically exerted, it is possible to create a value-added material having extremely high performance and function.

The producing method of the invention is a simple method for carrying out only the melting and kneading operations using the high shearing and forming apparatus having the inner feedback type screw, and it is unnecessary to add extra additive such as the compatibilizer. Therefore, it is possible to provide a method which is optimal for electronic or electric material which requires a continuous and pure microstructure.

Although only an example of a blend of polycarbonate (PC) and polymethyl methacrylate (PMMA) is described in a later-described, the same result can be obtained even if polyethyl methacrylate (PEMA) or polybutyl methacrylate (PBMA) are used as methacryl resin other than polymethyl methacrylate.

BRIEF DESCRIPTION OF THE DRAWINGS

The high shearing part supplies a constant amount of samples which are maintained in a molten state of constant temperature by a "valve" (symbol 63). The "high shearing part" is connected to a "driving part" (symbol 64) which rotates an inner feedback type screw at high speed.

EXPLANATION OF SYMBOLS 10 high shearing and forming apparatus
12 melting and kneading part
14 forming part
16 material supplying part
18 cylinder
20 feedback type screw
22 bearing
24 shaft
26 heater
28 sealing member (seal surface)
29 leading-tip end surface of screw
32 distance (gap) with from leading-tip end surface of screw
35 extruded part heater
36 T-die tip-end heater
38 T-die rear-end heater
40 discharge opening
42 thermocouple
44 hole of screw
46 inner feedback type structure
48 screw rear stage
50 screw front stage
61 sample supplying part
62 plasticizing part
63 valve

BEST MODE FOR CARRYING OUT THE INVENTION

The best mode for carrying out a melting and kneading method, an extrudate and a transparent resin material of the present invention will be described based on embodiments with reference to the drawings.

According to the present invention, using a high shearing and forming apparatus having an inner feedback type screw, the screw is rotated at screw rotation speed of 600 rpm to 3000 rpm, an immiscible polymer blend system is melted and kneaded, one of polymer components is formed into a matrix, a dispersed phase size of the other polymer component is controlled to 300 nm or less, more preferably 100 nm or less, and a polymer blend extrudate and a transparent resin material are produced. The "extrudate" produced in the invention may be merely kneaded extrudate ("kneaded material"), or may be formed into a sheet-like extrudate (molded product).

As the immiscible polymer blend, a case where a polymer blend extrudate and a transparent resin material are produced using 97-3% polycarbonate (PC) by weight and 3-97% methacryl-based resin by weight will be described.

As the methacryl resin, polymethyl methacrylate (PMMA), polyethyl methacrylate (PEMA) or polybutyl methacrylate (PBMA) is used.

To knead a mixture of polycarbonate and methacryl-based resin, it is possible to use a dry blend method in which a mixture is mixed in a grain state. The dry blend was carried out after polycarbonate and methacryl-based resin were dried in a vacuum at 80° C. for 12 hours.

Polycarbonate and methacryl-based resin are incompatible. To obtain a blend material thereof, both of them are usually mixed at 200 to 240° C. using a biaxial melting and kneading device or the like.

However, if one of components is formed into a matrix, an internal structure of an extrudate thereof becomes a so-called phase-separation structure in which a dispersed phase size of the other component is coarsened to several microns to several tens of micron meters level. Therefore, the dispersed phase size becomes greater than that of wavelength of a visible region, and the material becomes opaque.

To solve this problem, the present inventors applied closely to the study and development and as a result, they achieved a epochal finding that it was possible to obtain a blend extrudate and a transparent resin material having a nanodisperse structure in which dispersed phases (methacryl-based resin) having diameters of 300 nm or less, preferably 100 nm or less were uniformly and densely dispersed in a polycarbonate matrix phase by melting and kneading a blend of polycarbonate and methacryl-based resin at 200 to 240° C. in the vicinity of the melting point using a high shearing and forming apparatus having an inner feedback type screw instead of a normal biaxial screw type kneading device. Quite the same result could be obtained even when a blend has polycarbonate dispersed phase formed in a methacryl-based resin matrix phase.

Figure 1:
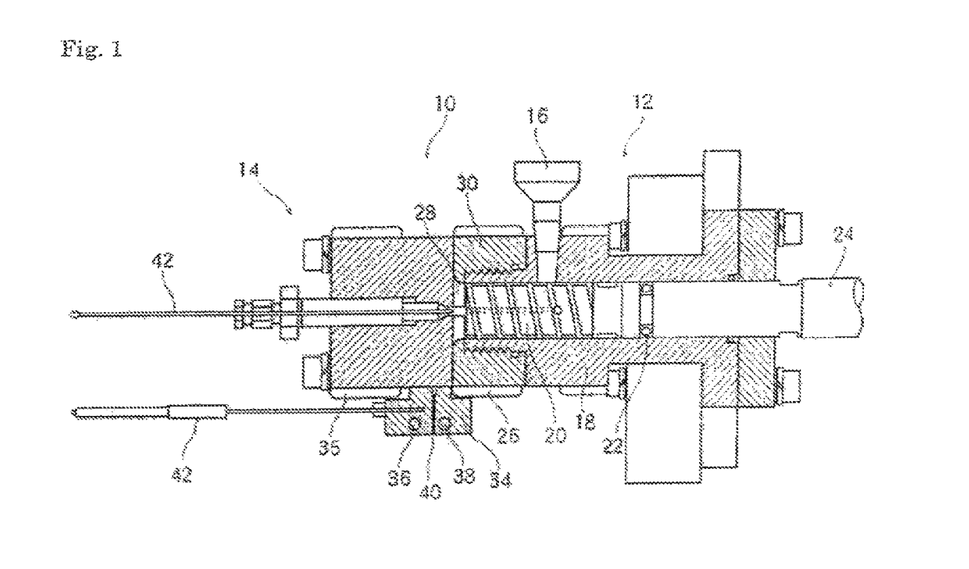
FIG. 1 shows a material kneading part in a high shearing and forming apparatus having an inner feedback type screw used for a producing method of the present invention.

FIG. 1 shows the high shearing and forming apparatus having the inner feedback type screw produced by the present inventors. Since the high shearing and forming apparatus itself is substantially the same as the high shearing and forming apparatus introduced in the patent document 1, it will be described briefly here. This high shearing and forming apparatus is used, and this is adjusted in the following procedure and used.

In FIG. 1, the high shearing and forming apparatus 10 includes a melting and kneading part 12 and a forming part 14. The forming part 14 includes an extruding and forming part or an injecting and forming part. The melting and kneading part 12 includes a material supplying part 16, a cylinder 18, a feedback type screw 20 mounted in the cylinder 18 and a shaft 24 connected to the cylinder 18 through a bearing 22. The cylinder 18 includes a heater 26 for melting resin in the cylinder 18.

Figure 2:
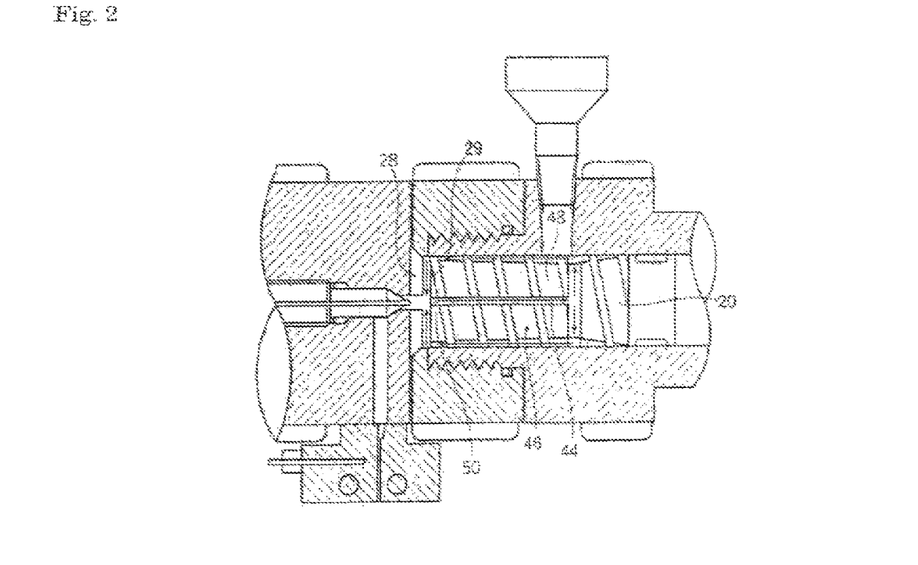
FIG. 2 shows an essential portion (front end of the screw) in FIG. 1.
Figure 3:
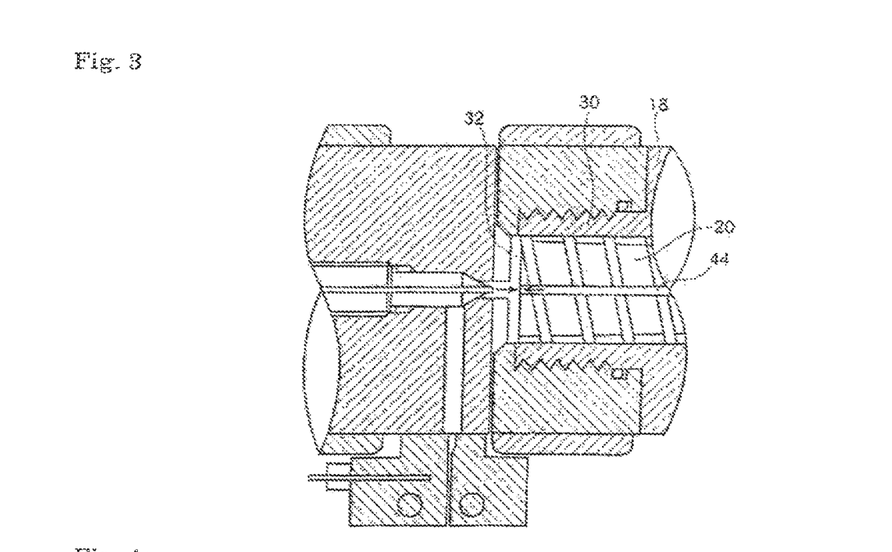
FIG. 3 is an enlarged view of the essential portion front end of the screw) in FIG. 2.

The cylinder 18 includes a sealing member 28 for sealing a portion between the cylinder 18 and the forming part 14. The sealing member 28 is provided on an end of the cylinder 18 opposed to the shaft 24. As shown in FIGS. 2 and 3, the cylinder 18 includes adjusting means for adjusting a distance (gap) 32 between a leading-tip end surface 29 of the screw 20 and a seal surface of the sealing member 28 opposed to the leading-tip end surface 29 ("seal surface 28", hereinafter). The adjusting means is provided on a rear side of the screw. This gap 32 is adjusted to a range from about 0.5 to about 5 mm.

The extruding and forming part which is the forming part 14 includes an extruded part heater 35 and a film-forming T-die 34. The T-die 34 includes a T-die tip-end heater 36 and a T-die rear-end heater 38. An extruded film passes through a discharge opening 40 formed between the heaters 36 and 38 at both ends. Thermocouples 42 are mounted to the extruding and forming part and the T-die tip-end heater 36 to measure temperatures. Measurement results are sent to a control device (not shown), and temperature of the melting and kneading part 12 and temperature of the T-die are adjusted.

The screw 20 has a hole 44, and an inner diameter of the hole 44 is in a range from about 1 mm to about 5 mm, more preferably in a range from about 2 mm to about 3 mm. The rotation speed of the screw is set into a range from 600 rpm to 3000 rpm, a shear rate is set into a range from 900 to 4500 sec$^{-1}$. Temperature in the cylinder 18 differs depending upon resin which is to be melted and kneaded, but when resin is amorphous resin, the temperature in the cylinder 18 is set to a value higher than a glass transition point, and when the resin is crystalline resin, the temperature in the cylinder 18 is set to a value higher than a melting point thereof. In the case of the present invention, it is preferable that resin is heated and melted to 230 to 240° C.

The screw 20 has a structure for sufficiently melting and kneading at least two incompatible resins in the screw 20.

FIG. 3 shows an inner feedback type structure 46 of resin in the feedback type screw 20. The inner feedback type structure 46 sufficiently kneads the mixed resin supplied from a screw rear stage 48 while feeding the resin to a screw front stage 50 by the screw 20, traps the kneaded resin in the gap 32 between the leading-tip end surface 29 of the screw 20 and the seal surface 28 opposed to the tip end surface, puts the kneaded resin into the hole 44 formed in substantially a center portion of the screw 20 in its longitudinal direction, and again returns the resin to the rear stage of the screw 20.

The kneading time in the inner feedback type structure 46 can freely be changed by circulating time through the inner feedback type structure 46. The kneading degree is adjusted by varying an inner diameter of the gap 32 between the tip end surface of the screw 20 and the seal surface 28 opposed to the tip end surface, and an inner diameter of the hole 44 of the screw 20.

The kneading degree is increased as the gap 32 is made thinner and as the inner diameter of the hole 44 of the screw 20 is made smaller, but it is necessary to optimize the inner diameters of the gap 32 and the hole 44 of the screw 20 in view of the viscosity of the resin. The mixing time of resin in the cylinder 18 is in a range from five seconds to 10 minutes.

According to the present invention, it is possible to melt and knead without adding compatibilizer to the incompatible blend resin. When one of the polymer components is formed into a matrix by the melting and kneading operations, a polymer blend extrudate and a transparent resin material in which a dispersed phase size of the other polymer component is controlled to a diameter of 300 nm or less and more preferably 100 nm or less are produced.

The high shearing and forming apparatus 10 includes cooling means (structure for surrounding the periphery of the cylinder 18 to flow cooling water: see paragraph 0038 in specification and FIG. 5 of patent document 1) for cooling the cylinder 18 to lower the shearing heating effect caused by high speed rotation of the screw 20.

When the high shearing and forming apparatus having the inner feedback type screw is used, as the forming conditions, it is important to set the screw rotation speed and the kneading time in the forming device in addition to the setting (230 to 240° C.) of the specific temperature.

In the present invention, it is possible to set the screw rotation speed to 600 to 3000 rpm and to set the kneading time to five seconds to 60 minutes. The optimal result could be obtained by setting the rotation speed to 1200 to 2500 rpm, and setting the kneading time to five seconds to four minutes.

The producing method of the present invention is characterized in that the screw rotation speed and the kneading time are set to the optimal numeric value conditions and the high shearing formation are carried out. An excellent result can be obtained by combining specific conditions. A satisfactory result can not be obtained even if one of the temperature setting and the screw rotation speed does not fall within the above conditions.

When the high shearing and forming apparatus 10 having the inner feedback type screw is used, it is possible to adjust the strength of the shearing flowing place or the kneading degree by varying the gap 32 between the tip end surface 29 of the screw 20 in the cylinder 18 in which the blend material is charged and the seal surface which is opposed to the tip end surface, and the inner diameter of the hole 44 of the screw 20.

Usually, an arbitrary value of the gap 32 can be set every 0.5 mm between 1 to 5 mm, and the inner diameter of the hole 44 of the screw 20 can also be set every 0.5 f between 1 to 5 f. The optimal result could be obtained by setting these values to 1 to 2 mm and 2.5 f.

The present invention is characterized in that the distance (gap) between the tip end surface of the screw and the seal surface which is opposed to the tip end surface and the inner diameter of the hole of the crew are set to the optimal numeric values and the high shearing formation are carried out. Excellent results can be obtained by combining specific conditions, and a satisfactory result can not be obtained even if one of the temperature setting and the setting condition of the gap does not fall within the above conditions.

EMBODIMENTS (Embodiment 1)

Concerning the present invention, an embodiment for producing a polymer blend extrudate and the transparent resin material from polycarbonate and methacryl-based resin as immiscible polymer blend will be described. In this embodiment, L-1225L, L-1225Y or L-1250Y (trade name) produced by Teijin Chemicals Ltd. was used as polycarbonate of raw material.

Further, CM-205 or CM-207 (trade name) produced by Taiwan Chi-Mei Corporation, or SUMIPEX LG21 (trade name) produced by Sumitomo Chemical Co., Ltd. was used as polymethyl methacrylate (PMMA).

Both of them were dried in a vacuum at 80° C. for 12 hours, and they were dried and blended at room temperature at the rate of polycarbonate of 97 to 3 weight % and polymethyl methacrylate of 3 to 97 weight %. Further, 2 to 5 g of dry blend material was supplied into the high shearing and forming apparatus illustrated in FIGS. 1 to 3, the gap (gap 32 in FIG. 3) and the inner diameter of the hole of the inner feedback type screw (inner diameter of hole 44 in FIG. 3) were set to 1 to 2 mm and 2.5φ, respectively, it was heated to 230 to 240° C. and melted, the screw rotation speed was set to 1800 rpm, the dry blend material was kneaded for two minutes and extruded from the T-die. For comparison, as a low sheared sample, a sample kneaded for two minutes at the screw rotation speed of 300 rpm was produced.

At that time, to lower the shearing heat, the temperature was controlled such that the resin temperature does not exceed 250° C. using cooling means which cools the cylinder. By this process, an extrudate having excellent surface state could be obtained.

Figure 4A:
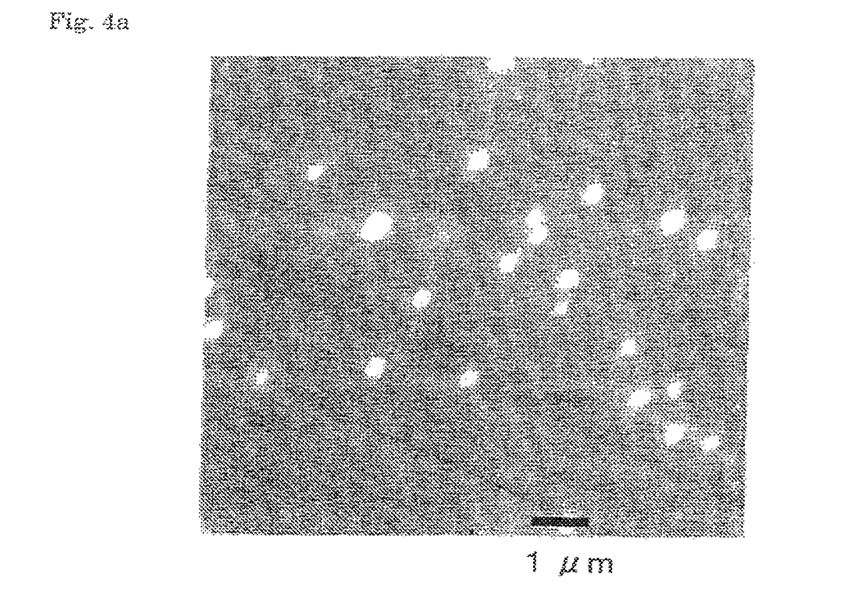
FIGS. 4(a), (b) and (c) are TEM images having different scales showing a microscopic dispersion structure of an extrudate formed of polycarbonate/polymethyl methacrylate=80/20 blend obtained in an embodiment 1.
Figure 4B:
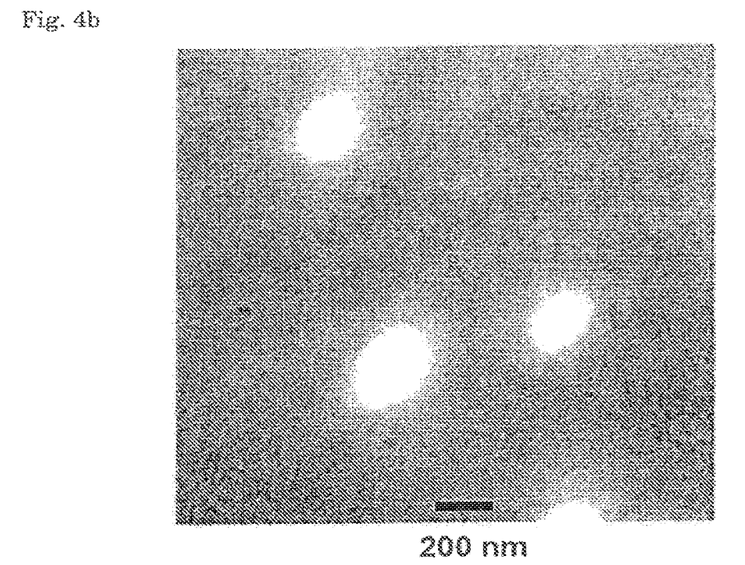
Figure 4C:
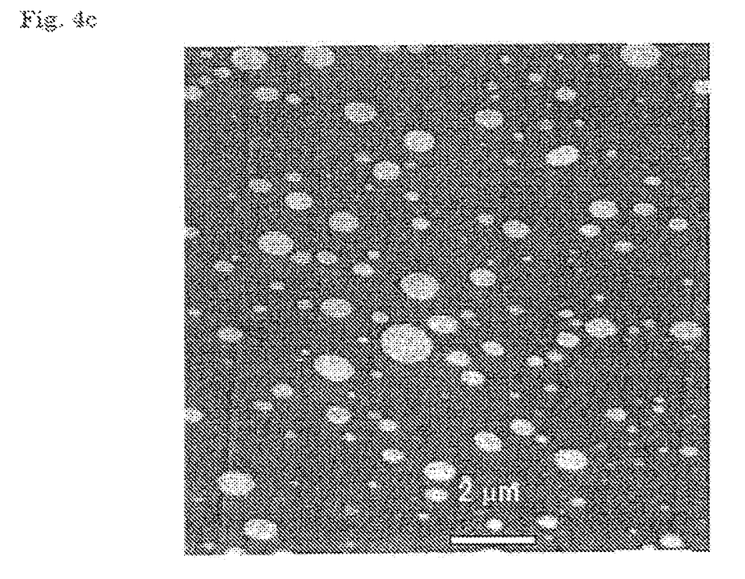

FIGS. 4(a), (b) and (c) are photographs showing the microscopic dispersion structure of the extrudate obtained in this embodiment. In this embodiment, the microscopic dispersion structure was measured at acceleration voltage of 100 kV using a transmission electron microscope (TEM) (H7600 produced by Hitachi, Ltd.). The photograph in the TEM observation was taken by a CCD camera as digital images.

When the structure was observed, the blend sample was colored in ruthenium tetroxide (RuO$_4$) for 30 seconds and then, a ultra-thin piece (120 nm) was produced by Ultramicrotome (Ultracut UCT produced by Leica Microsystems GmbH), and it was developed on a mesh on which collodion was pasted.

In FIGS. (a) and (b) (photographs), a structure in which PMMA having a size of about 200 nm enters into a polycarbonate matrix is observed. That is, in FIG. 4, a portion having a black background is a polycarbonate matrix phase, and white portions (small circles) dispersed in the background are PMMA domains.

Here, it was found that polymethyl methacrylate domains having the size of about 200 nm uniformly and densely existed in the polycarbonate matrix phase. Such a nanodisperse structure could be observed in a blend composition as wide as polycarbonate/polymethyl methacrylate=97/3 to 3/97 blend even if the matri9x phases were mutually changed.

FIG. 4(c) which is shown for comparison is a transmission electron microscope (TEM) photograph of a sample produced by kneading the same at the screw rotation speed of 300 rpm as a low sheared sample for two minutes. This condition corresponds to a conventional technique. As shown in the drawing, it is found that in the sample produced by the conventional technique, polymethyl methacrylate phases (white) of about 1.5 to 2 µm are dispersed in black polycarbonate matrix phases, and they are apparently larger than wavelength of the visible wavelength region (400 to 700 nm). As apparent from this size, the blend sample produced under the condition of the conventional technique, i.e., under the low shearing condition does not become transparent, but becomes white.

Optical transmissivity of the sample was measured in a film state of 100 µm thickness in ultraviolet visible wavelength region using a commercially available JASCO V-550 (trade name) UV/VIS spectrophotometer.

Figure 5:
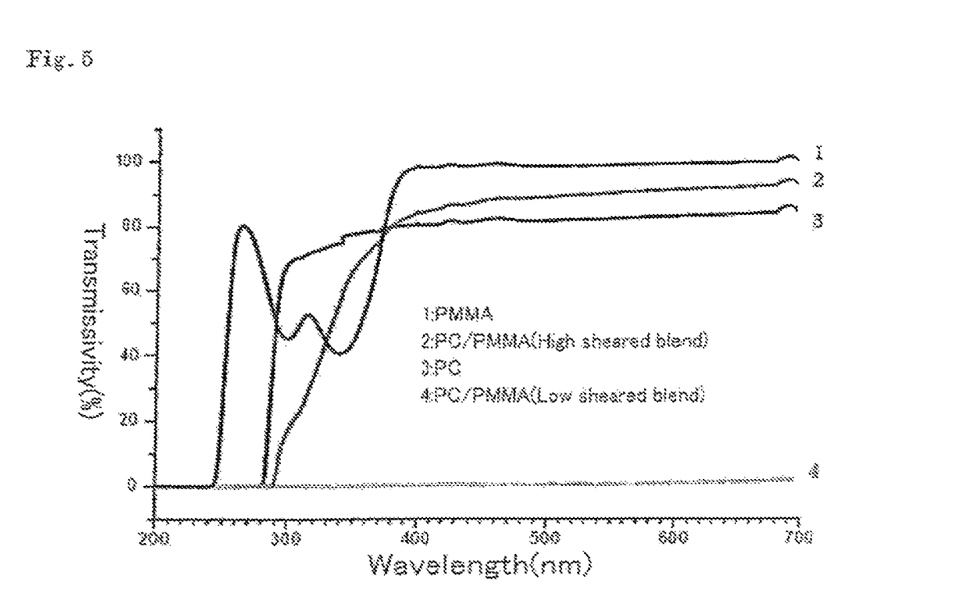
FIG. 5 shows transmissivity curves in a visible wavelength region of the extrudate formed of polycarbonate/polymethyl methacrylate=80/20 blend obtained in the embodiment 1 of the present invention.

FIG. 5 shows transmissivity curves with respect to wavelength which are measurement results of transmissivity in the visible wavelength region in polycarbonate/polymethyl methacrylate=80/20 blend sample produced in the embodiment.

In FIG. 5, a curve 1 is transmissivity curve of polymethyl methacrylate elemental substance, a curve 3 is transmissivity curve of polycarbonate elemental substance. It can be found that in each of the cases, the transmissivity is 80% or higher in the wavelength region of 400 nm or higher at the time of the elemental substance, and the material has extremely high transparency.

However, a curve 4 shows transmissivity curve of polycarbonate/polymethyl methacrylate=80/20 blend extrudate produced under low shearing (screw rotation speed of 300 rpm, kneading for two minutes). Since the transmissivity is 0% over the entire visible wavelength region, the sample becomes opaque (white).

Whereas, a curve 2 shows transmissivity curve of a blend extrudate produced under high shearing (1800 rpm, kneading for two minutes). It can be found that transmissivity is 80% or higher in the visible wavelength region, and the sample is transparent.

To evaluate the series of mechanical performance, dynamic viscoelasticity measurement (DMA) and stress-distortion measurement were carried out. The dynamic viscoelasticity measurement was carried out in an extension mode using Rheovibron DDV-25FP-S (produced by Orientec Co.). The measurement were carried out within the range of −150-240° C., 3° C./min of temperature rise speed and 1 Hz of the frequency. The stress-distortion measurement was carried out in such a manner that a dumbbell type sample was produced, the measurement condition was carried out at cross head speed of 10 mm/min, at temperature of 25° C. and at moisture of 50% in accordance with ASTM D412-80 test method using a tensile testing machine Tensilon UMT-300 (Orientec Co.).

Figure 6:
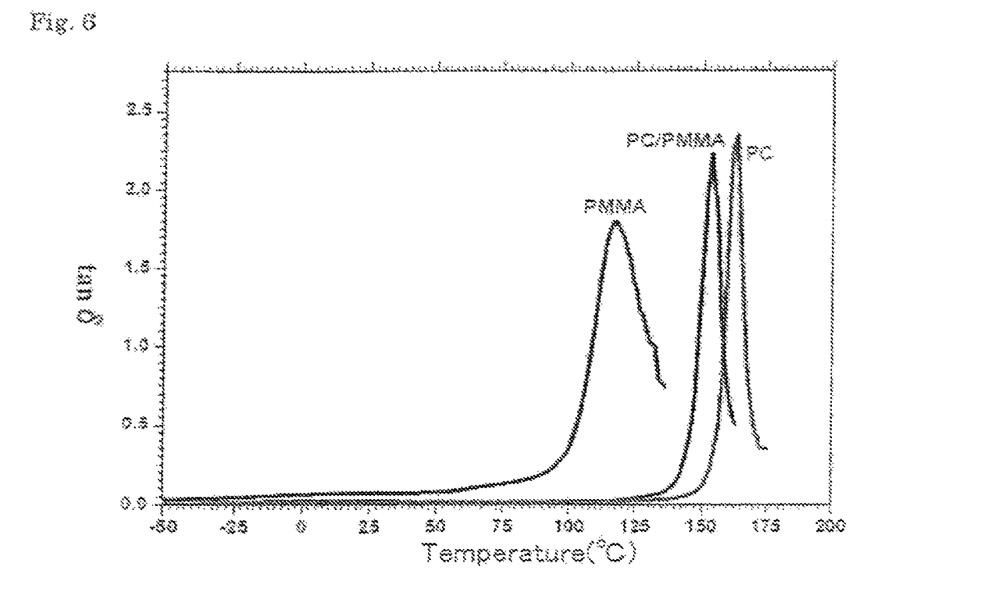
FIG. 6 shows a relation between tan δ and temperature obtained by dynamic viscoelasticity measurement of an extrudate formed of polymethyl methacrylate (PMMA) and polycarbonate (PC), as well as polycarbonate/polymethyl methacrylate=80/20 blend obtained the embodiment 1 of the invention.

FIG. 6 shows a relation between tan δ and temperature by the dynamic viscoelasticity measurement. Peak temperature of the tan δ corresponds to the glass transition point (Tg). As shown in the drawing, and Tg of PMMA is 115° C., Tg of PC is 162.5° C. Tg of PC/PMMA=80/20 blend is 152.5° C., and it can be found that Tg is enhanced by 37° C. That is, it could be found that heat resistance property was remarkably enhanced in the blend sample.

Figure 7:
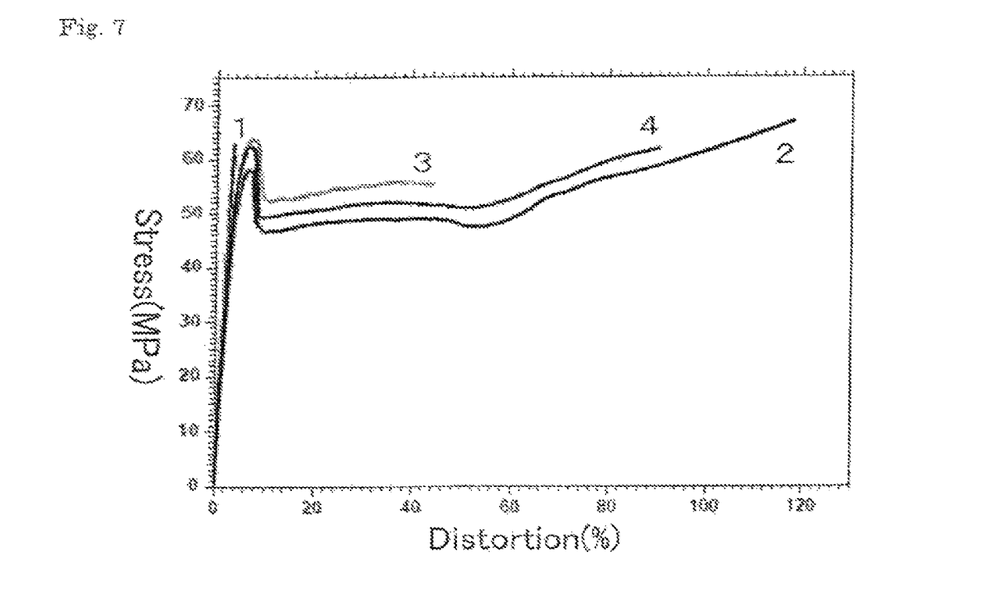
FIG. 7 shows a stress-distortion curve of the extrudate formed of polymethyl methacrylate (PMMA) and polycarbonate (PC), as well as polycarbonate/polymethyl methacrylate=80/20 blend obtained the embodiment 1 of the invention. In the drawing, a curve 1 shows a PMMA elemental substance, a curve 2 shows a PC elemental substance. A curve 3 shows a PC/PMMA=80/20 blend produced by low shearing (screw rotation speed is 300 rpm and kneading time is two minutes), and a curve 4 shows a PC/PMMA=80/20 blend produced by high shearing (screw rotation speed is 1800 rpm and kneading time is two minutes).

FIG. 7 shows a stress-distortion curve. In the drawing, it is found that a curve 1 shows a PMMA elemental substance, and it is cut before it is not extended almost at all. A curve 2 shows a PC elemental substance, and it is extended about 120% and is cut. A curve 3 shows a low sheared PC/PMMA=80/20 blend produced by low shearing (screw rotation speed is 300 rpm and kneading time is two minutes), and its breaking extension was 42%. Whereas, a curve 4 shows a PC/PMMA=80/20 blend produced by high shearing (screw rotation speed is 1800 rpm and kneading time is two minutes), and its breaking extension was remarkably improved as high as 90%. It was found that the breaking extension is remarkably enhanced by reducing the dispersed phase size.

(Embodiment 2)

Concerning the present invention, an embodiment for producing a polymer blend extrudate and a transparent resin material from polycarbonate and methacryl-based resin as an immiscible polymer blend will be described. In this embodiment, Panlite L-1225L, L-1225Y or L-1250Y (trade name) produced by Teijin Chemicals Ltd. was used as polycarbonate of raw material.

Further, CM-205 or CM-207 (trade name) produced by Taiwan Chi-Mei Corporation, or SUMIPEX LG21 (trade name) produced by Sumitomo Chemical Co., Ltd. was used as polymethyl methacrylate (PMMA).

Figure 8:
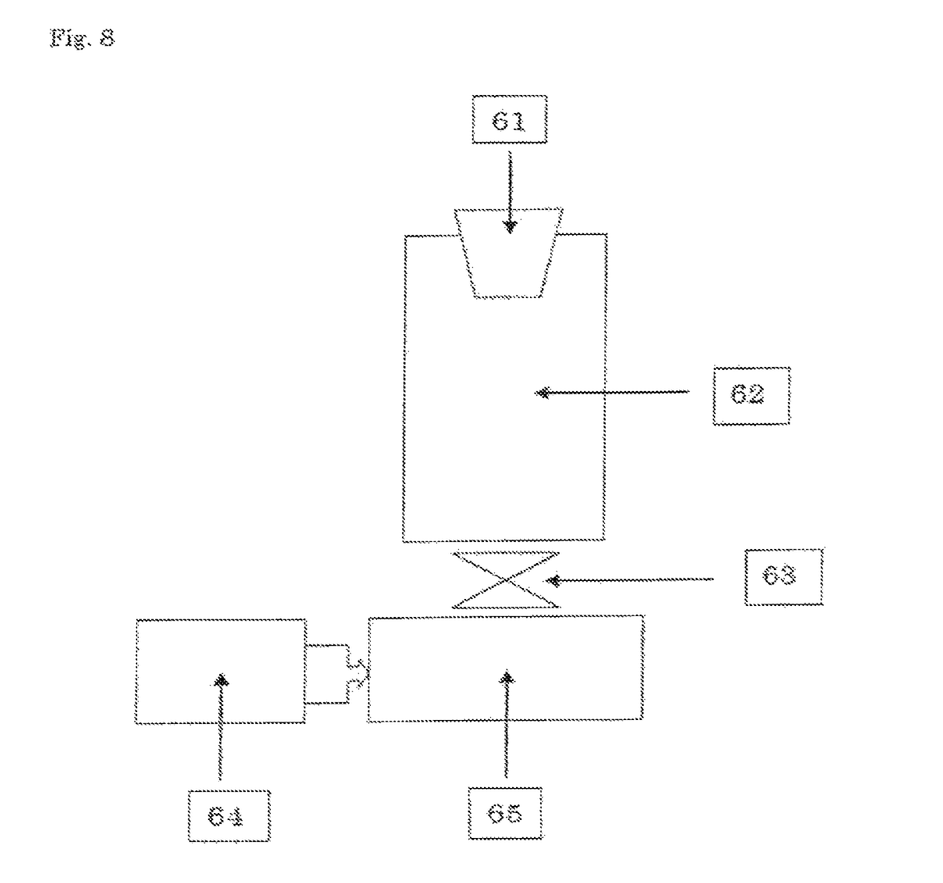
FIG. 8 is a block diagram of a plasticizing part-integral type high shearing and forming apparatus. This apparatus includes a "plasticizing part" (symbol 62) having a "supplying part" (symbol 61) for supplying a pre-dried samples of a predetermined ratio, and a "high shearing part" (symbol 65).

FIG. 8 is a block diagram of a plasticizing portion-integral type high shearing and forming apparatus (NHSS2-28 produced by NIIGATA MACHINE TECHNO CO., LTD.). This apparatus includes a "plasticizing part" (symbol 62) having a "sample supplying part" (symbol 61) which supplies pre-dried samples of a predetermined ratio, and a "high shearing part" (symbol 65). The high shearing part 65 supplies a constant amount of samples which are maintained in a molten state of constant temperature by a "valve" (symbol 63). The "high shearing part" is connected to a "driving part" (symbol 64) which rotates an inner feedback type screw at high speed. According to this plasticizing portion-integral type high shearing and forming apparatus, the plasticizing part is connected, and not only this, various portions of the apparatus are automatically controlled, the apparatus can continuously be operated without humans in attendance, and this apparatus is different from that used in the embodiment 1.

Both of them were dried in a vacuum at 80° C. for 12 hours, and they were dried and blended at room temperature at the rate of the polycarbonate of 97 to 3 weight % and the polymethyl methacrylate of weight %. Further, 3.5 g of the dry blend material melted plasticizing part was supplied into the high shearing and forming apparatus (FIG. 3), the gap (gap 32 in FIG. 3) and the inner diameter of the hole of the inner feedback type screw (inner diameter of hole 44 in FIG. 3) were set to 1 to 2 mm and 2.5 f, respectively, it was heated to 230 to 240° C. and melted, the screw rotation speed was set to 2250 rpm, the dry blend material was kneaded for 20 seconds and extruded from the T-die. For comparison, as a low sheared sample, a sample kneaded for 20 seconds at the screw rotation speed of 300 rpm was produced.

At that time, to lower the shearing heat, the temperature was controlled such that the resin temperature does not exceed 250° C. using cooling means which cools the cylinder. By this process, an extrudate having excellent surface state could be obtained.

Figure 9A:
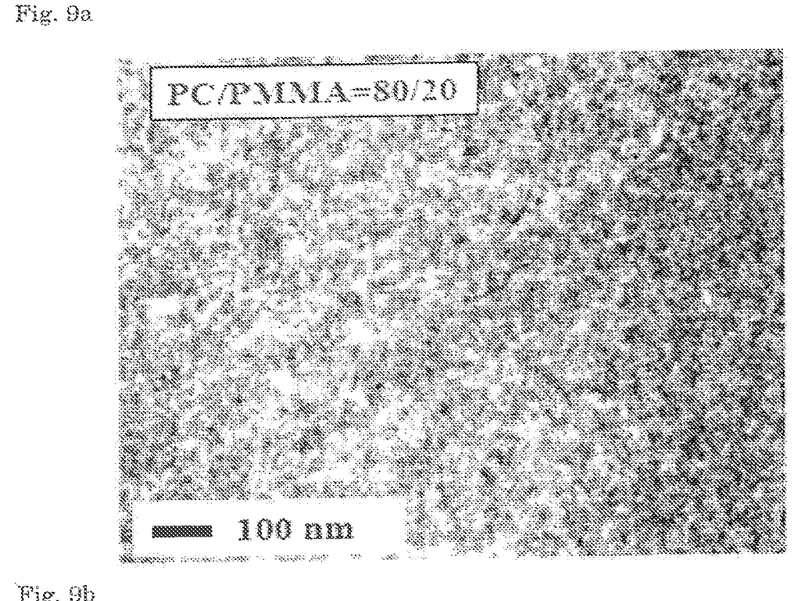
FIGS. 9(a) and (b) are TEM images showing a microscopic dispersion structure of extrudates formed of polycarbonate/polymethyl methacrylate=80/20 blend (a) and a microscopic dispersion structure of extrudates formed of polycarbonate/polymethyl methacrylate=20/80 blend (b).
Figure 9B:
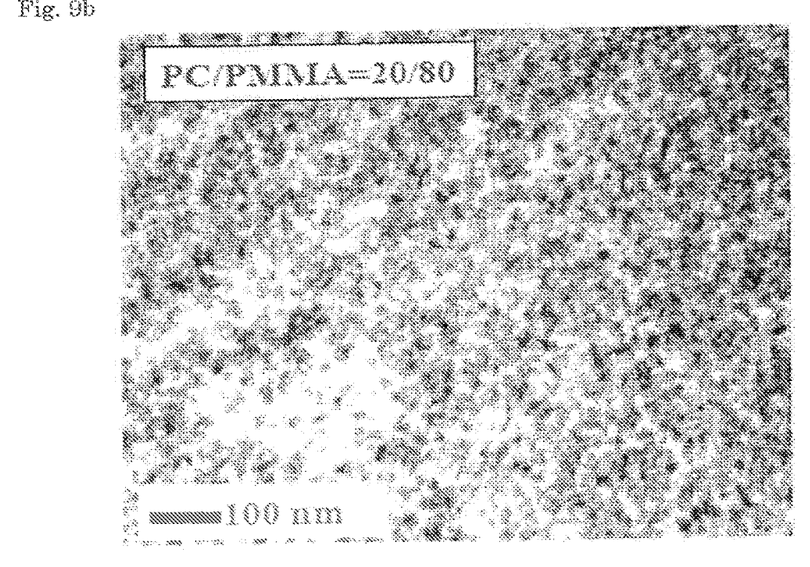

FIGS. 9(a) and (b) are photographs showing microscopic dispersion structures of an extrudate and a transparent resin material obtained in this embodiment. In this embodiment, the microscopic dispersion structure was measured at acceleration voltage of 120 kV using a transmission electron microscope (TEM) (JEM1230 produced by JEOL Ltd.). The photograph in the TEM observation was taken by a CCD camera as digital images. Blend compositions of (a) and (b) correspond to PC/PMMA=80/20 and 20/80, respectively.

When the structure was observed, the blend sample was colored in ruthenium tetroxide (RuO4) for 30 seconds and then, a ultra-thin piece (120 nm) was produced by Ultramicrotome (Ultracut UCT produced by Leica Microsystems GmbH), and it was developed on a mesh on which collodion was pasted.

In the photograph shown in FIG. 9(a), the black-colored portion is a polycarbonate (PC) matrix, and extremely small polymethyl methacrylate (PMMA) domains (white circle portions) of about 10 nm are observed in PC. In the photograph shown in FIG. 9(b), the black-colored PC domains of 30 to 40 nm size are observed in white PMMA matrix.

Here, it was found that polymethyl methacrylate domains or polycarbonate domains of about 10 nm size or about 30 to 40 nm size uniformly existed. Such a nanodisperse structure could be observed in a blend composition as wide as polycarbonate/polymethyl methacrylate=97/3 to 3/97 blend, i.e., even if matrix phases were mutually changed.

It could be found that in the embodiment 2, the fine domain structure which was one digit smaller than that of the embodiment 1. This is because that high shearing and kneading operations are carried out for two minutes at 1800 rpm, but in the embodiment 2, since the plasticizing part-integral type apparatus is used, the sample melted by the plasticizing part is supplied into the high shearing part, the high shearing and kneading operations are carried out at 2250 rpm for a short time as short as 20 seconds. Usually, when blend materials have polymers having different indices of refraction, if the dispersed phase size is increased, an effect of dispersion is increased, and the transparency is deteriorated. However, if the dispersed phase size becomes 100 nm or less like the blend material produced by the present invention, the transparency is remarkably secured.

Indices of refraction of films (thickness of 0.5 mm) of the PC/PMMA blend extrudate and the transparent resin material produced by the embodiment 2 were measured at room temperature at wavelength of 589 nm using Abbe refractometer DR-M2 produced by ATAGO CO., LTD.

Results of the indices of refraction are as follows:

| samples | Indices of refraction |
|---|---|
| PC | 1.585 |
| PC/PMMA = 80/20 | 1.573 |
| PC/PMMA = 20/80 | 1.511 |
| PMMA | 1.492 |

As shown above, a transparent resin material having the index of refraction between 1.585 of the PC elemental substance and 1.492 of PMMA could be produced by PC/PMMA transparent blend, the index of refraction was 1.573 in the case of PC/PMMA=80/20 blend, and the index of refraction was 1.573 in the case of PC/PMMA=20/80 blend.

On the other hand, transparency and mechanical performance were measured using samples produced by the embodiment 2, but a result was almost the same as that of the embodiment 1.

The best modes for carrying out the melting and kneading method, the extrudate produced by the melting and kneading method and the transparent resin material were described above based on the embodiments, but the invention is not limited to the embodiments, and the invention can be carried out within a range of technical matters described in claims of course.

INDUSTRIAL APPLICABILITY

In the case of the structure in which the internal structure of the blend extrudate is phase-separated, i.e., when one of the polymer components was formed into a matrix, the dispersed phase size of the other polymer component became a level of several tens micron meters only by melting and kneading the immiscible polymer blend using the conventional forming machine (screw rotation speed was about 300 rpm), the synergistic effect by the blend was deteriorated, and desired performance and function could not be exerted. Especially, even if the polycarbonate of transparent resin and the methacryl-based resin of the present invention were blended by the conventional technique, a transparent blend material could not be obtained, and only white material could be obtained.

If extra additive such as a compatibilizer was added, a dispersed phase size of submicron level could be realized, but since impurities were mixed, this method practically has a large problem for optical material and electron and electric materials which requires continuous and pure fine structures.

Whereas, according to the present invention, even in the case of the material of the incompatible blend system, if one of the polymer components is formed into a matrix, it is possible to obtain a polymer blend extrudate and a transparent resin material having a microscopic dispersion structure in which the other polymer component having a diameter of dispersed phase of 300 nm or less or 100 nm or less is uniformly dispersed, or having a structure in which both the polymer components are mutually continuously connected microscopically.

Therefore, according to the present invention, as compared with the conventional phase-separated material of the sea/land structure having large dispersed phase size (several micron meters or more), original properties of polymer constituting the blend are exerted in the synergetic manner. Therefore, it is possible to create a value-added material having extremely high performance and high function, and this is extremely useful as material, optical material and electron and electric materials which requires continuous and pure fine structures, and requires transparency of various purposes.

For example, when time optical communications comes, the optical fiber fulfills a main role. It is expected that the methacryl-based resin which is the transparent resin is used as an optical fiber material. However, when the methacryl-based resin lacks heat resistance, it is possible to provide a high quality heat resistant optical fiber by blending polycarbonate having excellent heat resistance to keep transparency. Desired heat resistance is optimized by an adding amount of polycarbonate by nano-blending.

As apparent from the result shown in FIG. 7, the methacryl-based resin (PMMA) has high elastic modulus and excellent rigidity, but breaking extension and ductility are poor. The polycarbonate (PC) has rigidity lower than the methacryl-based resin but has excellent ductility. Therefore, it is possible to provide an optimal and mechanically balanced material in which drawbacks of both of them are compensated and rigidity and ductility are balanced by producing a PC/PMMA blend of a structure in which they are mixed and dispersed in nano-level.

Mechanical properties of these materials are reflected as surface hardness, pencil hardness of PMMA is hard as hard as about 3H, it is not easily scratched, but hardness of PC is as soft as about 2B and it is easily scratched. That is, PC is more excellent than PMMA in terms of heat resistance but its surface hardness is low and PC is not suitable as a material used in a state where PC is located on a surface or on outer side. Hence, by producing a PC/PMMA blend of a structure in which they are mixed and dispersed in nano-level, it is possible to provide a material having balanced surface hardness, i.e., a transparent material having optimized pencil hardness by blend composition having pencil hardness of its surface between 3H and 2B.

Indices of refraction of the methacryl-based resin (PMMA) and polycarbonate are 1.492 and 1.585, respectively. Therefore, to provide an optimal material requiring an index of refraction between these numeric values, it is possible to provide a material having an index of refraction optimized by producing a transparent resin blend of the invention.

The invention claimed is:

1. A melting and kneading method for producing a compatible nanostructured resin, wherein dispersed phases are uniformly dispersed in a matrix resin, comprising:
a supplying step of supplying at least two incompatible resins from a material supplying part into a melting and kneading part which includes a cylinder, a screw, the material supplying part and a heating part, wherein the at least two incompatible resins include at least a first resin and a second resin; and
a melting and kneading step to make the compatible nanostructured resin by melting and kneading the incompatible resins, wherein
a rotation speed of the screw is set into a range from 600 rpm to 3000 rpm, and a shear rate of the screw is set into a range from 900 to 4500 sec$^{-1}$, wherein the dispersed phases have sizes of 300 nm or less, and wherein the first resin has a polycarbonate of 97 to 3 weight % and the second resin has a methacryl-based resin of 3 to 97 weight %.

2. A melting and kneading method for producing a compatible nanostructured resin, wherein dispersed phases are uniformly dispersed in a matrix resin, comprising:
a supplying step of supplying at least two incompatible resins from a material supplying part into a melting and kneading part which includes a cylinder, a screw, the material supplying part and a heating part, wherein the at least two incompatible resins include at least a first resin and a second resin; and
a melting and kneading step to make the compatible nanostructured resin by melting and kneading the incompatible resins, in which the melted and kneaded resin is fed from a rear end of the screw to a front end thereof and trapped in a gap formed in the front end of the screw and then, returned from the gap to the rear end of the screw, wherein
a rotation speed of the screw is set into a range from 600 rpm to 3000 rpm, and a shear rate of the screw is set into a range from 900 to 4500 sec$^{-1}$, wherein the dispersed phases have sizes of 300 nm or less, and wherein the first resin has a polycarbonate of 97 to 3 weight % and the second resin has a methacryl-based resin of 3 to 97 weight %.

3. A melting and kneading method for producing a compatible nanostructured resin, wherein dispersed phases are uniformly dispersed in a matrix resin, comprising:
a supplying step of supplying at least two incompatible resins from a material supplying part into a melting and kneading part which includes a cylinder, a screw, the material supplying part, a heating part and a seal, wherein the at least two incompatible resins include at least a first resin and a second resin; and
a melting and kneading step to make the compatible nanostructured resin by melting and kneading the incompatible resins, in which the resin is fed from a rear end of the screw to a front end thereof and trapped in a gap formed in the front end of the screw and then, returned from the gap to the rear end of the screw, wherein
a gap formed between a tip end surface of the screw and a sealing surface opposed to the tip end surface is set into a range from 0 to 5 mm, an inner diameter of a hole of the screw is set into a range from 1 mm to 5 mm, and a rotation speed of the screw is set into a range from 600 rpm to 3000 rpm, a shear rate is set into a range from 900 to 4500 sec$^{-1}$, and the first resin is heated to a temperature higher than a glass transition point when the resin is amorphous resin, and the first resin is heated to a temperature higher than a melting point of crystalline resin when the first resin is crystalline resin, wherein the dispersed phases have sizes of 300 nm or less, and wherein the first resin has a polycarbonate of 97 to 3 weight % and the second resin has a mathacryl-based resin of 3 to 97 weight %.

4. An extrudate which is made by the melting and kneading method according to any one of claims 1 to 3.

5. The extrudate according to claim 4, wherein the extrudate comprises any one of a rod, a film, a sheet and fiber.

6. A melting and kneading method according to any one of claims 1 to 3, further comprising:
a melting and plasticizing step of the incompatible resins before the supplying step.

7. A transparent resin material comprising a polycarbonate of 97 to 3 weight % and a methacryl-based resin of 3 to 97 weight %, wherein dispersed phases (methacryl-based resin or polycarbonate) having sizes of 300 nm or less are uniformly dispersed in a matrix resin (polycarbonate or methacryl-based resin), and the transparent resin material has transmissivity of 80% or higher in 400 nm to 700 nm which is wavelength region of a visible part when the resin is formed into a film having a thickness of 100 μm.

8. The transparent resin material according to claim 7, wherein the methacryl-based resin comprises one selected from group of a polymethyl methacrylate, polyethyl methacrylate and polybutyl methacrylate.

9. The transparent resin material according to claim 6, wherein its breaking extension is increased by adding polycarbonate.

10. The transparent resin material according to claim 7, wherein the dispersed phases have sizes of 100 nm or less.

* * * * *